United States Patent [19]
Hu

[11] Patent Number: 6,068,274
[45] Date of Patent: May 30, 2000

[54] ORIENTATION ROLLER MECHANISM FOR BABY STROLLERS

[76] Inventor: Stephen Hu, No 2, Ta-Tung Road, Hsin-Chu Industrial Park, Taiwan

[21] Appl. No.: 08/980,150

[22] Filed: Nov. 26, 1997

[51] Int. Cl.$^7$ ........................................................ B62B 7/04
[52] U.S. Cl. ........................................ 280/87.051; 16/35 R
[58] Field of Search ........................ 16/35 R; 280/87.051, 280/87.01, 87.021, 11.21, 47.34

[56] References Cited

U.S. PATENT DOCUMENTS

| | | | |
|---|---|---|---|
| Re. 32,346 | 2/1987 | Klamer et al. | 280/11.2 |
| 1,974,152 | 9/1934 | Draws | 280/11.2 |
| 3,790,187 | 2/1974 | Radu et al. | 280/11.2 |
| 4,932,676 | 6/1990 | Klamer | 280/11.2 |
| 5,371,922 | 12/1994 | Chern et al. | 16/47 |

*Primary Examiner*—Anne Marie Boehler
*Assistant Examiner*—Avraham H. Lerner
*Attorney, Agent, or Firm*—Pro-Techtor International Services

[57] ABSTRACT

An orientation roller mechanism for baby strollers, the mechanism is mounted on the chassis of a baby stroller, by this mechanism, the baby stroller can only run forwards, the danger induced when a baby sitting in the baby stroller makes a backward moving under a bad visual condition can be avoided, and therefore safety of the baby can be increased.

3 Claims, 6 Drawing Sheets

ORIENTATION ROLLER MECHANISM FOR BABY STROLLERS

BACKGROUND OF THE INVENTION

1. Field of the Invention

The present invention is related to an orientation roller mechanism for baby strollers, and especially to such a mechanism which can only run forwards and can not run rearwards.

2. Description of the Prior Art

Conventional baby strollers can mostly rotate and slide freely in the whole area within 360 degrees, however, when they are used in families, they often collide with articles everywhere due to limitation of space; especially, in view that a conventional baby stroller can move rearwards and therefore a baby sitting in the baby stroller often makes a backward moving and may collide with articles unseen and is hurt, sometimes may even fall down stairs inadvertently. Accordingly, if a baby stroller can only be moved forwards and laterally, it can be helpful to safety of the baby during learning walking, that is, he can see objects in the area where he moves to.

SUMMARY OF THE INVENTION

Accordingly, the object of the present invention is to provide a baby stroller having an orientation roller mechanism which provides the function of moving the baby stroller in one direction and can not move it rearwards. In such one direction moving, the danger induced when the baby makes a backward moving under a bad visual condition can be avoided, and therefore increases safety of riding on the baby stroller.

The present invention will be apparent in construction of its structure and functions thereof after reading the detailed description of the preferred embodiment of the present invention in reference to the accompanying drawings.

DETAILED DESCRIPTION OF THE PREFERRED EMBODIMENT

Figure 1:
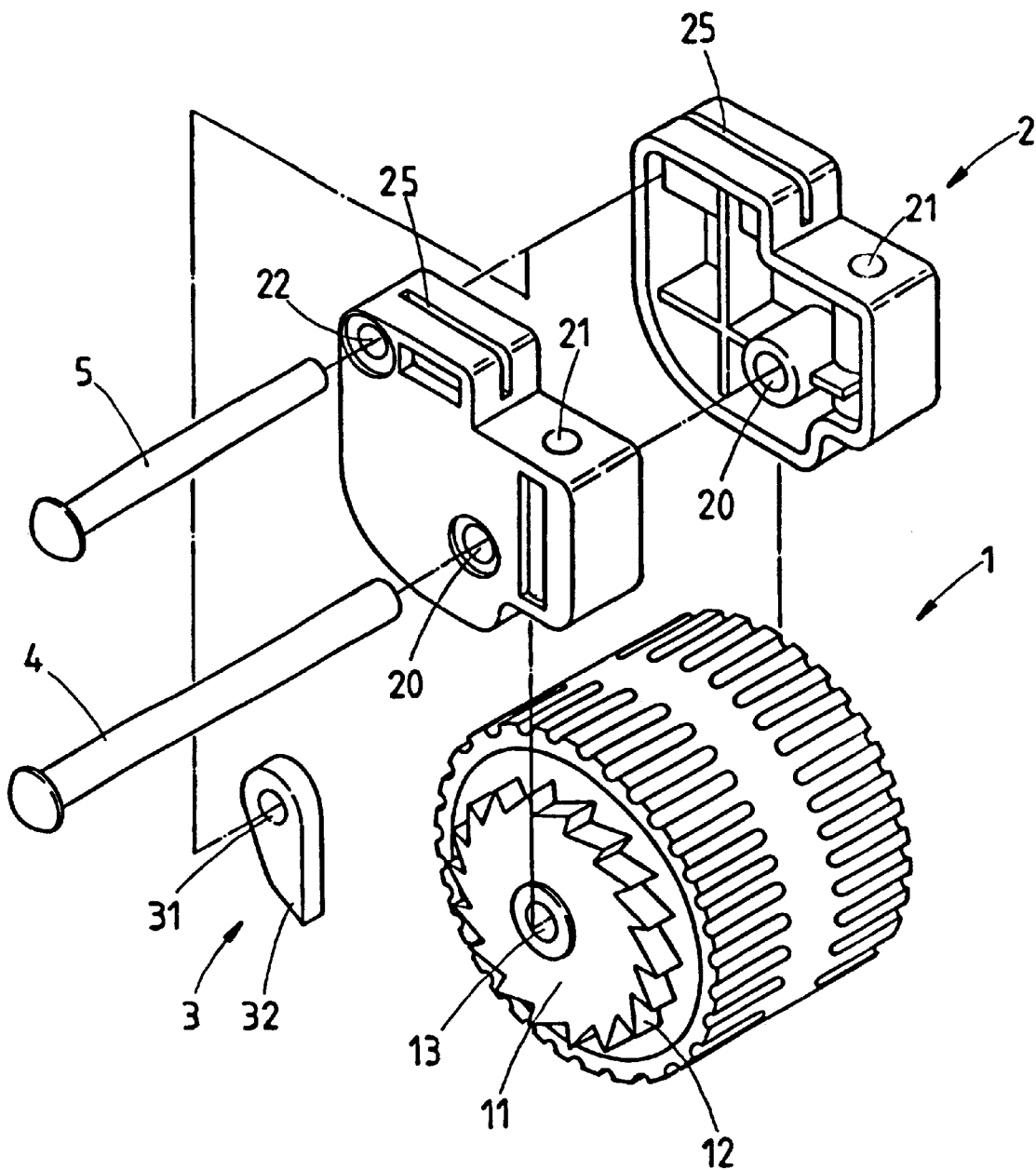
FIG. 1 is an analytic perspective view of the present invention.

Refering firstly to FIG. 1 of the drawings, the orientation roller mechanism of the present invention is comprised mainly of: a roller 1, two side plates 2, an orientation sheet 3, a wheel axle 4 and an orientation sheet axle 5, wherein:

The roller 1 is a transverse cylindrical roller with a ratchet wheel 11 on one side thereof, the ratchet wheel 11 is provided with a plurality of teeth 12, the roller 1 is provided centrally with an axle hole 13.

The two side plates 2 are symetrical to each other, and are provided at both sides of the roller 1, the wheel axle 4 can be inserted into two axle wheel holes 20 on the side plates 2 which are further provided each with a vertical insertion hole 21, a longitudinal slit 25 is provided on the top of each side plate 2, and a hole 22 is provided for insertion of the orientation sheet axle 5.

The orientation sheet 3 is provided at a suitable position with a hole 31 through which the orientation sheet axle 5 can be inserted and be fixed between the two side plates 2, an end thereof is tapered to form a sharp stop portion 32.

The wheel axle 4 is used for rotation of the roller 1.

The orientation sheet axle 5 is used for inserting through of the orientation sheet 3 for positioning.

Figure 2:
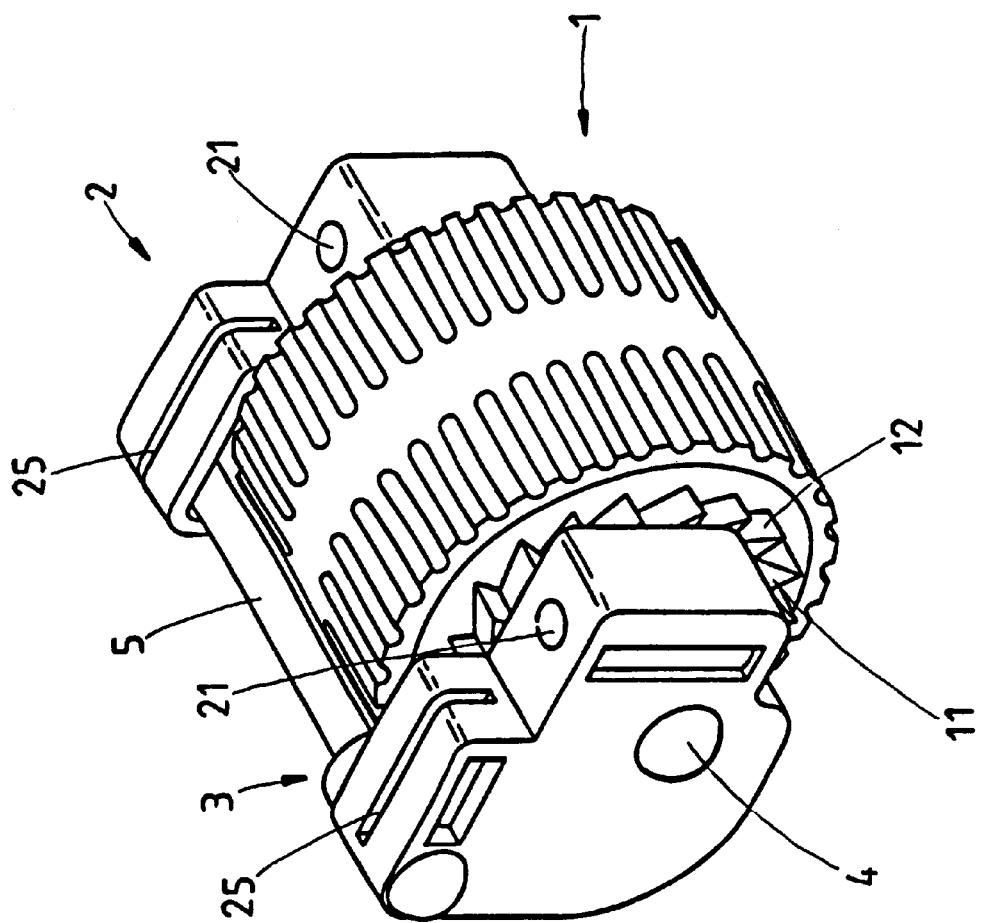
FIG. 2 is an apparent perspective view of an assembled embodiment of the present invention.
Figure 3:
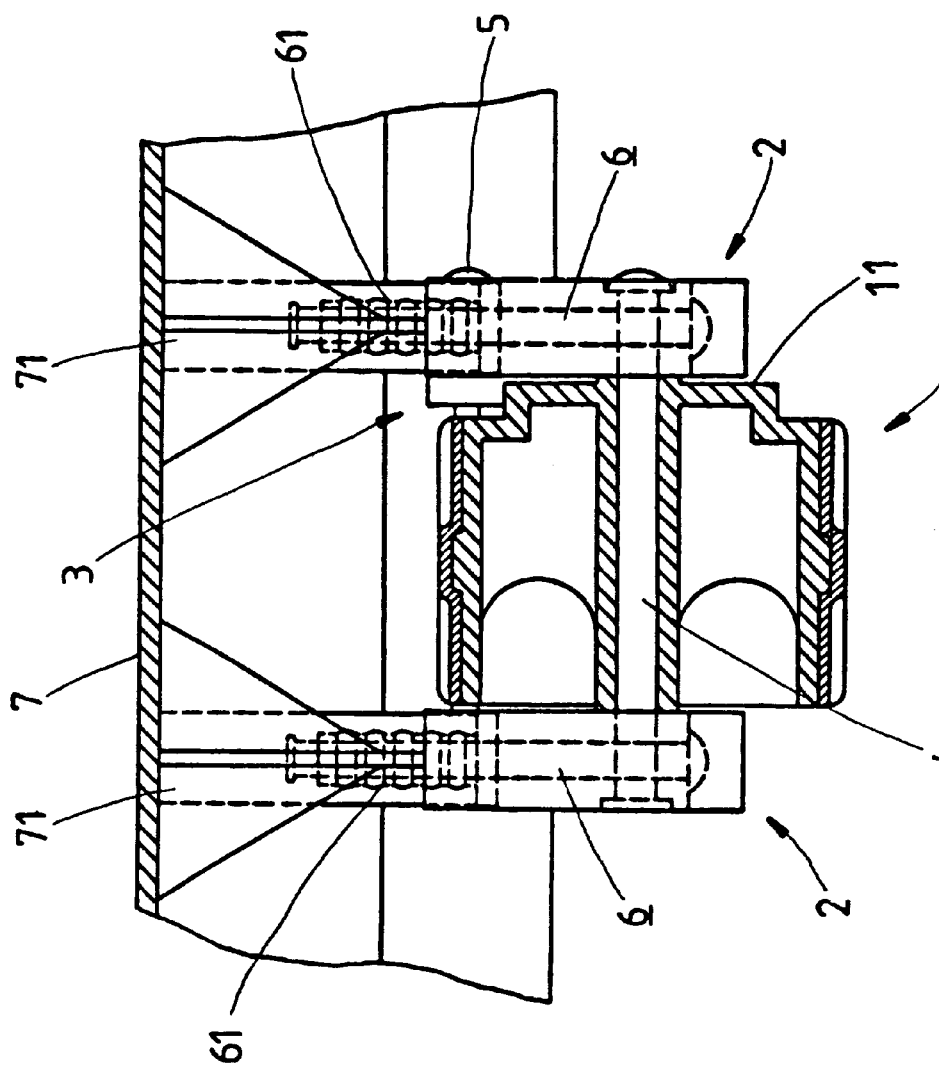
FIG. 3 is a sectional view showing the construction of the present invention.
Figure 4:
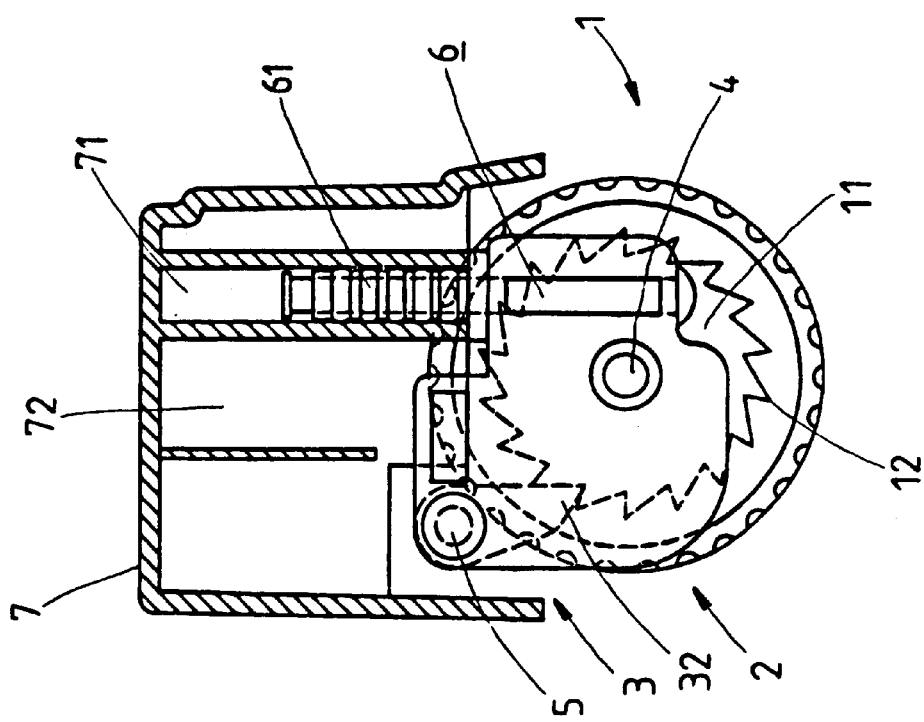
FIG. 4 is another sectional view showing the construction of the present invention.
Figure 6:
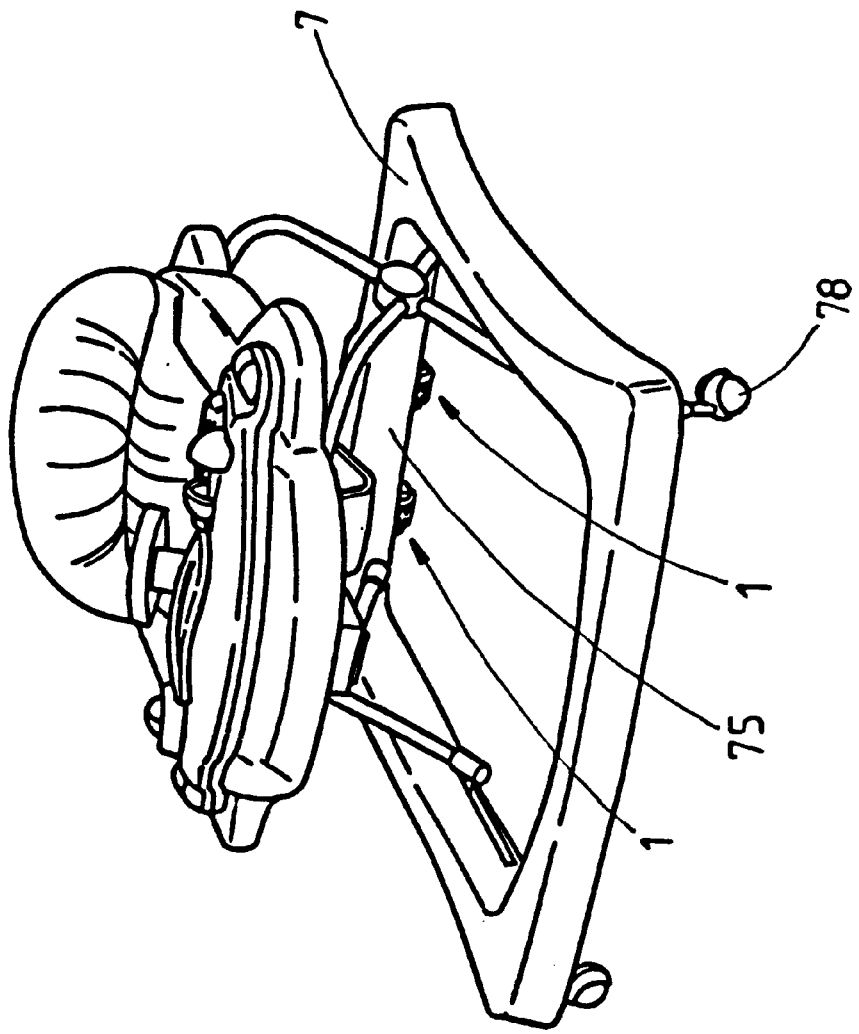
FIG. 6 is an apparent perspective view showing practising of the present invention on a baby stroller.

FIG. 2 is an apparent perspective view of an assembled embodiment of the present invention, when in use, as is shown in the drawing together with FIG. 3 and 4, the present invention is used to be mounted on the bottom of the chassis 7 of a baby stroller, and preferably on the rear edge 75 of the chassis 7 (as shown in FIG. 6). Due to the fact that th e side plates 2 are provided each with a vertical insertion hole 21, an additional insertion post 6 can be connected to a combining member 61 to be formed integrately therewith by rivetting, then the two combining members 61 relieved outwardly are inserted into two hollow combining posts 71 on the bottom of the chassis 7, such tight connecting of the annular structure of the combining member 61 and the hollow combining posts 71 makes the present invention connected to the hollow combining post s 71; two positioning plates 72 for the chassis 7 are inserted in the longitudinal slits 25 to make them stable rather than waving.

Figure 5:
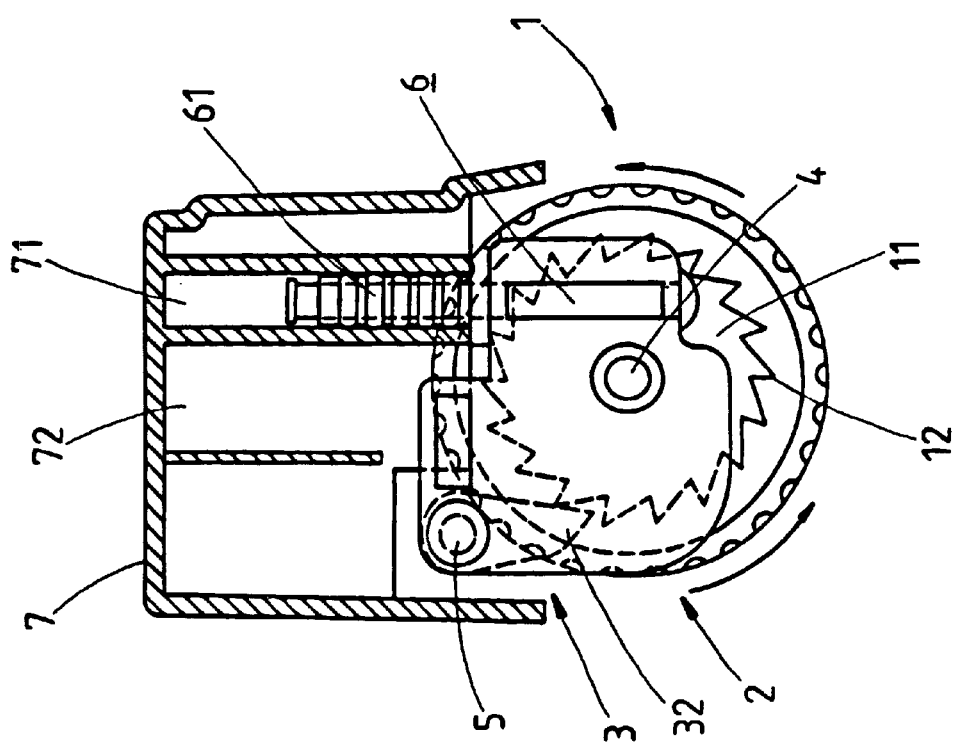
FIG. 5 is a sectional view showing the motion of the present invention.

Referring to FIG. 6, the front wheels of the chassis 7 of the baby stroller are in the shape of two ball like rollers 78 capable of rotating in 360 degrees, the rear edges 75 thereof are mounted with two orientation roller mechanisms of the present invention, hence it can be known from FIG. 5 that, when the rollers 1 are rotated counterclockwisely in the drawing shown (i.e., run forwardly), the orientation sheets 3 will not limit rotation of the ratchet wheels 11; on the countrary, if the rollers 1 are rotated clockwisely in the drawing shown (i.e., run backwardly), the sharp stop portions 32 of the orientation sheets 3 will engage the teeth 12 of the ratchet wheels 11 to hinder the ratchet wheels 11 from clockwise rotation, and hinder the rollers 1 from rotation, thereby the rollers 1 are limited to only running forwards rather than rearwards.

In conclusion, limitation of direction of the orientation roller mechanism for baby strollers of the present invention can avoid a baby sitting in a baby stroller having dager in backward moving, and therefore increases safety of the baby during sitting in the baby stroller, the mechanism with such function has never existed in the markets nor been published, thus the present invention is provided with improveness and practicability, therefore, what I claim as new and desire to be secured by Letters Patent of the United States are:

1. An orientation roller mechanism adapted for baby strollers comprising:

a roller, two side plates, an orientation sheet, a wheel axle and an orientation sheet axle, wherein:

said roller is a transverse cylindrical roller with a ratchet wheel on one side thereof, said ratchet wheel is provided with a plurality of teeth, said roller is provided centrally with an axle hole;

said two side plates are symmetrical to each other, and are provided at both sides of said roller, said wheel axle extends through two wheel axle holes on said two side plates which are further provided each with a vertical insertion hole adapted to receive an insertion post, a longitudinal slit is provided on the top of each of said side plates and is adapted to receive a stabilizing plate of a baby stroller chassis, and a sheet axle hole is provided for insertion of said orientation sheet axle;

said orientation sheet is provided with a hole through which said orientation sheet axle is inserted and fixed between said two side plates, an end thereof is tapered to form a sharp stop portion, said orientation sheet is mounted on said orientation sheet axle;

said wheel axle is used for rotation of said roller; such that by means of said ratchet wheel and said orientation sheet, said roller can only rotate in one direction, rotation in another direction is prevented by said sharp stop portion of said orientation sheet engaging in one of said teeth of said ratchet wheel.

2. The orientation roller mechanism adapted for baby strollers as claimed in claim 1, further comprising two insertion posts with combining members, wherein said two insertion posts are inserted into said vertical insertion holes, and said combining members are adapted to be inserted into hollow combining posts on the bottom of the baby stroller chassis, such that said side plates are more securely connected to the baby stroller chassis.

3. The orientation roller mechanism adapted for baby strollers as claimed in claim 1, wherein two positioning plates provided on the baby stroller chassis are insertable in said longitudinal slits on said side plates for positioning.

* * * * *